(12) United States Patent
Park et al.

(10) Patent No.: US 11,814,544 B2
(45) Date of Patent: Nov. 14, 2023

(54) SUBSTRATE TREATED WITH ANTIMICROBIAL COATING AGENT AND PREPARATION METHOD THEREOF

(71) Applicant: LG CHEM, LTD., Seoul (KR)

(72) Inventors: Minsung Park, Daejeon (KR); Soonhee Kang, Daejeon (KR); Kwang Seoung Jeon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 340 days.

(21) Appl. No.: 17/263,994

(22) PCT Filed: Sep. 27, 2019

(86) PCT No.: PCT/KR2019/012637
§ 371 (c)(1),
(2) Date: Jan. 28, 2021

(87) PCT Pub. No.: WO2020/067799
PCT Pub. Date: Apr. 2, 2020

(65) Prior Publication Data
US 2021/0301152 A1    Sep. 30, 2021

(30) Foreign Application Priority Data

Sep. 27, 2018 (KR) .................. 10-2018-0115319
Sep. 26, 2019 (KR) .................. 10-2019-0119139

(51) Int. Cl.
C09D 5/14    (2006.01)
C09D 7/61    (2018.01)
C08K 5/00    (2006.01)
D06M 16/00   (2006.01)

(52) U.S. Cl.
CPC .............. *C09D 5/14* (2013.01); *C08K 5/0025* (2013.01); *C09D 7/61* (2018.01); *D06M 16/00* (2013.01)

(58) Field of Classification Search
None
See application file for complete search history.

(56) References Cited

U.S. PATENT DOCUMENTS

2009/0162560 A1    6/2009  Deluca et al.
2012/0288550 A1   11/2012  Yoo et al.
(Continued)

FOREIGN PATENT DOCUMENTS

| CN | 101945964 A | 1/2011 |
| CN | 102791809 A | 11/2012 |
| CN | 103782202 A | 5/2014 |

(Continued)

OTHER PUBLICATIONS

Kobayashi, et al., Verification of Antimicrobial Activities of Japanese Lacquers, 2009, Iwate Industrial Research Institute Research Report No. 16, with English translation, 5 pages.

(Continued)

*Primary Examiner* — Peter A Salamon
(74) *Attorney, Agent, or Firm* — ROTHWELL, FIGG, ERNST & MANBECK, P.C.

(57) ABSTRACT

The present disclosure relates to a substrate in which an antimicrobial coating agent including urushiol and an inorganic antimicrobial agent is fixed and coated onto the surface, and a method for antimicrobial coating on the surface of the substrate.

19 Claims, 6 Drawing Sheets

(56) References Cited

U.S. PATENT DOCUMENTS

| | | | |
|---|---|---|---|
| 2013/0222915 A1 | 8/2013 | Kim et al. | |
| 2016/0185990 A1* | 6/2016 | Cho | C09D 11/03 252/514 |

FOREIGN PATENT DOCUMENTS

| | | | |
|---|---|---|---|
| JP | 2002-001024 A | 1/2002 | |
| JP | 2006-022075 A | 1/2006 | |
| JP | 2013-516511 A | 5/2013 | |
| KR | 10-2001-0011478 A | 2/2001 | |
| KR | 10-0332702 B1 | 4/2002 | |
| KR | 10-2005-0034060 A | 4/2005 | |
| KR | 10-0668782 B1 | 1/2007 | |
| KR | 10-2007-0078477 A | 8/2007 | |
| KR | 10-2008-0095638 A | 10/2008 | |
| KR | 10-2009-0011881 A | 2/2009 | |
| KR | 10-2009-0043901 A | 5/2009 | |
| KR | 10-1013203 B1 | 2/2011 | |
| KR | 10-2011-0077169 A | 7/2011 | |
| KR | 10-2011-0100423 A | 9/2011 | |
| KR | 10-1215268 B1 | 12/2012 | |
| KR | 10-1307376 B1 | 9/2013 | |
| KR | 10-2014-0058054 A | 5/2014 | |
| KR | 10-2015-0079096 A | 7/2015 | |
| KR | 10-1599112 B1 | 3/2016 | |
| KR | 10-1839187 B1 | 3/2018 | |
| KR | 10-2018-0045421 A | 5/2018 | |
| WO | 2016-072726 A3 | 6/2006 | |
| WO | 2008-133370 A1 | 11/2008 | |
| WO | 2009-057935 A1 | 5/2009 | |
| WO | 2014-030123 A2 | 2/2014 | |
| WO | 2017-029482 A1 | 2/2017 | |

OTHER PUBLICATIONS

Snyder, "An Overview of Oriental Lacquer", Journal of Chemical Education, American Chemical Society, US, vol. 66, No. 12, Dec. 1, 1989, pp. 977-980.
Extended European Search Report dated Jul. 16, 2021, of the corresponding European Patent Application No. 19864338.9, 6 pages.
Miyakoshi Tetsuo, Oriental Lacquer and Polymer, Kobunshi, 2007, vol. 56, Issue 8, pp. 608-613, with English translation (10 pages).
Ogawa et al., Paint Film Forming by Hardening of Urushiol at High Temperature, Kobunshi Ronbunsyu, 2012, vol. 69, No. 2, pp. 71-76 with English translation (20 pages).
International Search Report issued for International Application No. PCT/KR2019/012637 dated Jan. 16, 2020, 6 pages.

\* cited by examiner

| | Before washing | After washing |
|---|---|---|
| Comparative Example 2 |  |  |
| Example |  |  |
| Comparative Example 3 |  |  |

SUBSTRATE TREATED WITH ANTIMICROBIAL COATING AGENT AND PREPARATION METHOD THEREOF

CROSS-REFERENCE TO RELATED APPLICATION(S)

This application is a 35 U.S.C. 371 National Phase Entry application from PCT/KR2019/012637, filed on Sep. 27, 2019, designating the United States, which claims the benefit of priority from Korean Patent Application No. 10-2018-0115319 filed on Sep. 27, 2018 and Korean Patent Application No. 10-2019-0119139 filed on Sep. 26, 2019 with the Korean Intellectual Property Office, the full disclosures of which are incorporated herein by reference.

TECHNICAL FIELD

The present disclosure relates to a substrate in which an antimicrobial coating agent including urushiol and an inorganic antimicrobial agent is fixed and coated onto the surface, and a method for antimicrobial coating on the surface of the substrate.

BACKGROUND ART

Recently, as a concern over the quality of air increases, the demands for indoor air cleanliness have increased, and accordingly, air purification filters for removing foreign substances in the air have been developed. High efficiency filters used for air purification can effectively trap almost all harmful microorganisms, and the microorganisms trapped in the filter can survive for a long time and even proliferate. Therefore, by imparting antimicrobial or antibacterial properties to the filters, antimicrobial filters that can not only remove bacteria present in the filter but also sufficiently remove or sterilize microorganisms such as bacteria, viruses, fungi, and the like floating in the air have been developed.

However, when inorganic-based antimicrobial agents are to be used in the substrates such as the antimicrobial filters in this way, the inorganic-based antimicrobial agents exist in the form of particles with several micro units in size, and therefore, it may be difficult to introduce them into the filter

BRIEF SUMMARY OF THE INVENTION

Technical Problem

Accordingly, a coating technique capable of not only imparting antimicrobial properties against various microorganisms, but also fixing an antimicrobial agent on the surface of a substrate is needed.

Technical Solution

There is provided a substrate in which an antimicrobial coating agent showing antimicrobial properties against various microorganisms including Gram-positive and Gram-negative bacteria is fixed and coated onto the surface, and a method for antimicrobial coating of the surface of the substrate.

In one aspect, there is provided a substrate in which an antimicrobial coating agent including urushiol and an inorganic antimicrobial agent is coated onto the surface, wherein the inorganic antimicrobial agent is fixed to the surface of the substrate while urushiol being crosslinked.

In another aspect, the present disclosure provides a method for antimicrobial coating on the surface of a substrate, including the steps of: adding an organic antimicrobial agent to a coating agent including urushiol; impregnating the substrate with the coating agent to perform high temperature polymerization; and drying the substrate, wherein the inorganic antimicrobial agent is fixed on the surface of the substrate while urushiol being crosslinked.

Advantageous Effects

A substrate in which an antimicrobial coating agent is fixed on the surface is provided. A natural polymer having antimicrobial properties is used as the antimicrobial coating agent instead of a synthetic polymer, which is thus environmentally friendly, the concentration of the coating agent can be easily adjusted, polymerization can be performed through drying, it is excellent in chemical resistance and thermal stability, fiber coating can be performed and thus pores are not clogged, and it is effective for providing excellent antimicrobial activity by the inorganic antimicrobial agent due to a thin coating thickness.

DETAILED DESCRIPTION OF THE INVENTION

According to one aspect of the present disclosure, there is provided a substrate in which an antimicrobial coating agent including urushiol and an inorganic antimicrobial agent is coated onto the surface, wherein the inorganic antimicrobial agent is fixed onto the surface of the substrate while urushiol being crosslinked.

As used herein, the term "substrate" may be a material having a fixed form, which can support the antimicrobial coating agent according to the present disclosure such that it can be fixed on the surface. As a material of the substrate, materials such as fiber, silicon, glass, metal, magnetic material, semiconductor, ceramic, and the like may be used without limitation. Specific Examples thereof include non-woven fabric; acrylic polymers such as poly(methyl methacrylate) (PMMA) or the like; polyethylene (PE), polypropylene (PP), polystyrene, polyethersulfone (PES), polycycloolefin (PCO), polyiourethane, or polycarbonate (PC), but are not limited thereto. Additionally, the substrate can modify the surface to have reactivity or introduce an additional layer of new material. The substrate may have various forms such as a sphere or plate, without being limited thereto.

When the coating agent is treated on the surface of the substrate, the inorganic antimicrobial agent may be fixed on the surface of the substrate while urushiol being crosslinked, preferably thermally crosslinked. In addition, the coating agent may be uniformly coated on the surface of the substrate.

According to another aspect of the present disclosure, there is provided a method for antimicrobial coating on the surface of a substrate, including the steps of: adding an organic antimicrobial agent to a coating agent including urushiol; impregnating the substrate with the coating agent to perform high temperature polymerization; and drying the substrate, wherein the inorganic antimicrobial agent is fixed on the surface of the substrate while urushiol being crosslinked.

The urushiol may be diluted in an alcoholic solvent or oil

According to still another aspect of the present disclosure, there is provided an antimicrobial filter including the substrate.

According to still further another aspect of the present disclosure, there is provided an air purification apparatus including an antimicrobial filter.

Urushiols are phenolic materials which are major components of the sap of the lacquer tree *Toxicodendron* spp., including *Rhus verniciflua*. The urushiol monomer has a structure containing two —OH groups (catechol structure) adjacent to a benzene ring in which 15 or 17 long-chain hydrocarbons are bonded to the adjacent carbon. The side-chain hydrocarbons are saturated hydrocarbons or unsaturated hydrocarbons containing 1 to 3 double bonds. Urushiol consists of a catechol structure which is a strong antioxidant active site, and an amphiphilic structure having a lipid-soluble long side chain within the same molecule, so it has excellent biocompatibility, and can exhibit strong antioxidant and antimicrobial activities.

Urushiol can be obtained by purifying from urushi lacquer, and the purification method may generally include, but not limited to, an extraction method using an organic solvent such as n-hexane, methanol, ethanol, isopropanol or butanol. For example, urushiol can be obtained by an extraction method in which urushi lacquer and a hydrophilic organic solvent are mixed and subjected to centrifugation to separate an urushiol layer in a state of being dissolved in the hydrophilic organic solvent, and the separated urushiol layer is heated to remove the organic solvent and water, thereby extracting urushiol.

Urushiol may also be obtained through various synthetic methods known in the art, or may be commercially available.

In addition, in the case of people with idiosyncrasy, dermatitis referred to as "poison ivy rash" may be caused in the whole body just by approaching *Toxicodendron vernicifluum*. This allergen is urushiol. Therefore, since urushiol can cause an allergic reaction when used in the form of monomers, it can be used by polymerization. In the case of urushiol sap, it is cured by an enzymatic reaction catalyzed by laccase, and in the case of urushiol extract, it is common to cure with hydrogen peroxide or photo-crosslink by introducing molecules capable of photo-crosslinking.

Figure 2:
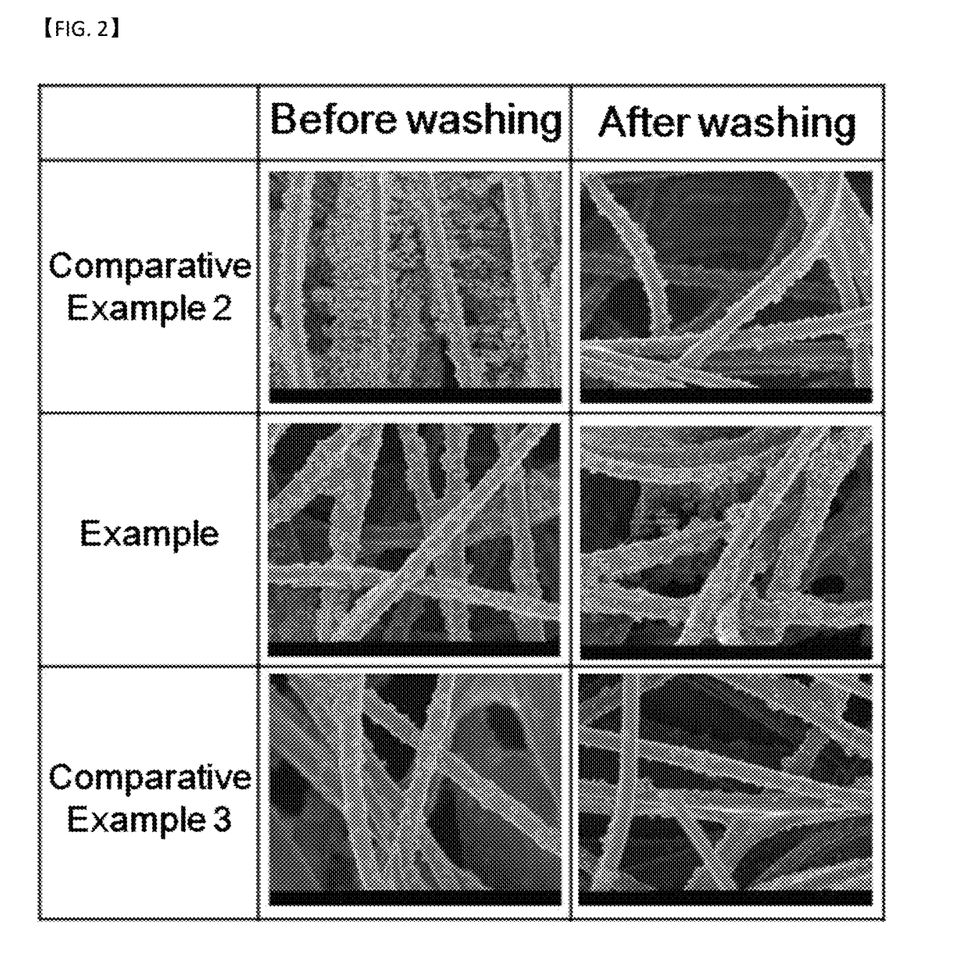
FIG. 2 shows scanning electron microscope (SEM) images of the surface of the substrates prepared according to one Example and Comparative Examples of the present disclosure before and after washing.
Figure 3:
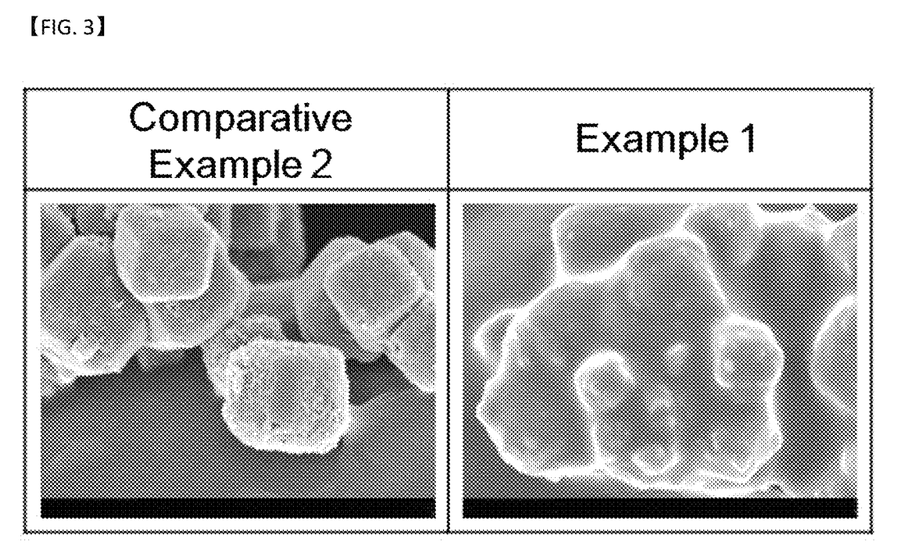
FIG. 3 shows scanning electron microscope (SEM) images of the surface of the substrates prepared according to one Example and Comparative Example of the present disclosure.
Figure 5:
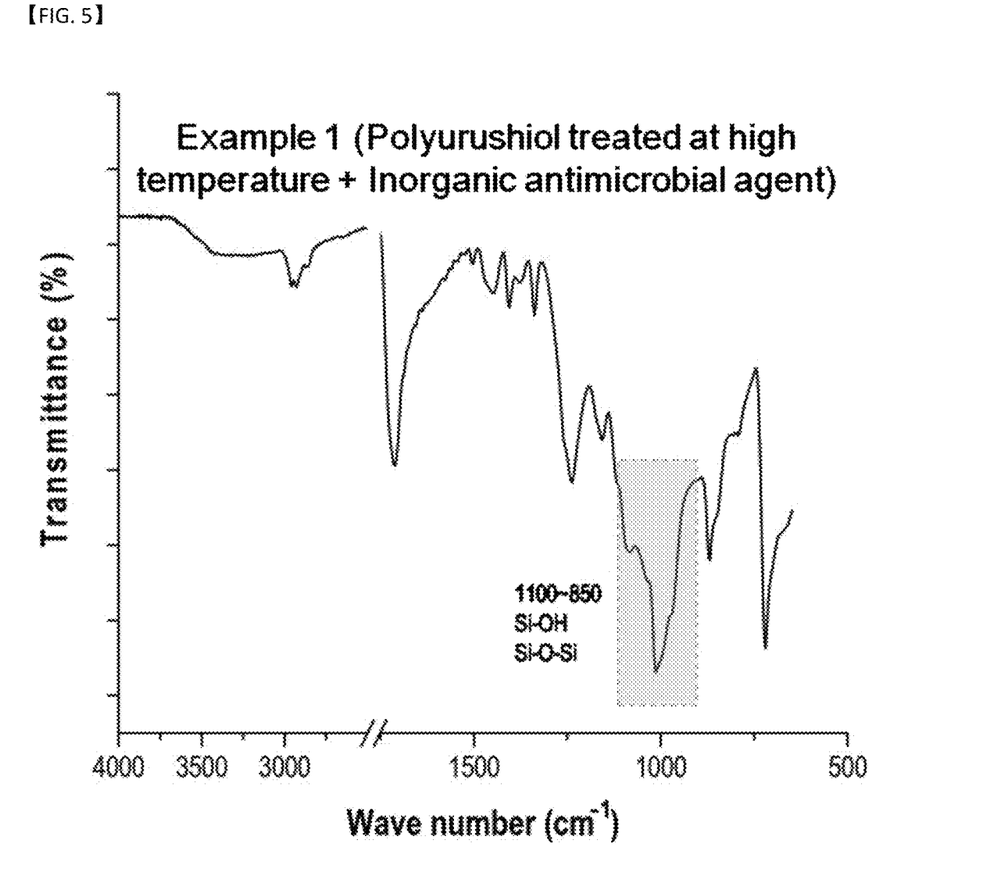
FIG. 5 shows the results of FT-IR analysis of the substrate coated according to one Example of the present disclosure.

In one embodiment of the present disclosure, it has been found through the FT-IR analysis that when the coating agent composition of the present disclosure is treated on the surface of the substrate, urushiol is cured through a simple thermal crosslinking in the air (FIG. 5). In another embodiment of the present disclosure, it has been found that urushiol has a chemically stronger bond and a stronger adhesion by forming a polymer as described above. Specifically, it has been found that when the coating agent composition of the present disclosure is treated on the surface of the substrate, urushiol is thermally crosslinked and cured, and is firmly bound to the inorganic antimicrobial agent on the surface, and therefore, there is no difference in the surface of the substrate before and after washing (FIG. 2). Moreover, it has been found that the inorganic antimicrobial agent is coated by urushiol and is thereby bound to the surface of the fiber, the surface is relatively smooth, and the fiber surface and the particles are stably fixed because they are coated together during the urushiol curing process (FIG. 3).

Further, urushiol contains saturated or unsaturated alkyl groups in the molecule and thus can impart hydrophobicity to the substrate.

As used herein, the term "inorganic antimicrobial agent" is a generic term for an inorganic compound containing metals or metal ions having antimicrobial properties such as silver, zinc, copper and the like. The inorganic antimicrobial agent may be a liquid or solid, preferably solid. Examples of inorganic antimicrobial agent include, but are not limited to, inorganic materials such as zeolites, synthetic zeolites, metal oxides, zirconium phosphate, calcium phosphate, calcium zinc phosphate, ceramics, soluble glass powder, silica alumina, titanium zeolite, apatite, calcium carbonate, and the like. In a specific example, the inorganic antimicrobial agent may be those in which metal ions having excellent antimicrobial properties such as silver, copper, manganese, zinc, or the like are subjected to ion exchange or adsorbed on an inorganic carrier such as zeolites or silica alumina. In a preferred example, the inorganic antimicrobial agent may be copper oxide, zinc oxide, zinc pyrithione, zeolite, specifically zeolite containing silver ions.

Zeolites are crystalline aluminosilicates having a plurality of pores. Zeolites are inorganic polymer materials formed by three-dimensionally connecting silicon (Si) and aluminum (Al) through oxygen atoms and usually have a fine crystal size of 1 μm. Zeolites have structural characteristics that they have various shapes and nanopores in the size of 0.3 nm to 10 nm depending on the type.

The zeolites may be at least one selected from the group consisting of A-type zeolite, X-type zeolite, Y-type zeolite, high-silica zeolite, sodalite, mordenite, analcime, clinoptilolite, chabazite, and erionite.

In zeolites, the bonds of each atom are loose in the crystal structure, and water molecules are usually filled in the nanopores existing on the inside, and even when this water is released with high heat, the skeleton is maintained as it is, and thus other fine particles can be adsorbed. Zeolites is excellent in the roles as a cation exchanger and the adsorption function of foreign substances due to numerous nano-sized pores, and thus may exhibit an effect of adsorbing and removing heavy metals or bacteria.

In addition, a large number of silver ions ($Ag^+$) are absorbed in zeolites, thereby having excellent sterilization and antimicrobial activities. The sterilization and antimicrobial actions of silver ions ($Ag^+$) are achieved while the silver ions (AO being eluted, and the elution of silver ions ($Ag^+$) is achieved through an ion exchange reaction between cations such as $Na^+$, $Ca^{2+}$, $Mg^{2+}$ and the like and $Ag^+$ ions. Further, the eluted $Ag^+$ ions adsorb and bind —SH and $COO^-$ or $OH^-$ ions in proteins from bacterial cells as microorganisms, which cause cell transformation, and leads to a condensation-dehydration reaction, and makes bacterial metabolism and energy metabolism and respiration difficult, thereby exhibiting bactericidal and antimicrobial effects based on the principle of killing bacteria.

In the present disclosure, silver ions ($Ag^+$) may exist in the state of being ionically bonded in zeolites.

It is preferable that the particle size of the zeolites, i.e., the particle size, is 1 to 3 μm. If the size is smaller than 1 μm, there is a problem that the cost of washing and drying in the preparation process is increased. In addition, inhalation toxicity by nanoparticles may occur. If the size is greater than 3 μm, it may be difficult to carry out dispersion, and the phenomenon of clogging of the pores of the substrate may occur. In addition, reaction with silver nitrate solution may not work well.

Urushiol has antimicrobial activity against Gram-positive bacteria, and the inorganic antimicrobial agent has antimicrobial activity against Gram-negative bacteria. The coating agent composition provided in the present disclosure may have antimicrobial activity against both Gram-positive bacteria and Gram-negative bacteria because the inorganic antimicrobial agent is firmly fixed onto the surface of the substrate while the urushiol being thermally crosslinked when treated on the substrate surface.

In one example, the bacteria against which the coating composition of the present disclosure shows antimicrobial activity may be Gram-positive or Gram-negative bacteria, or may be non-responsive to gram staining. The bacteria may also be aerobic or anaerobic. The bacteria may be pathogenic or nonpathogenic. Examples of the species or genus of the bacteria include *Abiotrophia, Achromobacter, Acidaminococcus, Acidovorax, Acinetobacter, Actinobacillus, Actinobaculum, Actinomadura, Actinomyces, Aerococcus, Aeromonas, Afipia, Agrobacterium, Alcaligenes, Alloiococcus, Alteromonas, Amycolata, Amycolatopsis, Anaerobospirillum, Anaerorhabdus, Arachnia, Arcanobacterium, Arcobacter, Arthrobacter, Atopobium, Aureobacterium, Bacteroides, Balneatrix, Bartonella, Bergeyella, Bifidobacterium, Bilophila Branhamella, Borrelia, Bordetella, Brachyspira, Brevibacillus, Brevibacterium, Brevundimonas, Brucella, Burkholderia, Buttiauxella, Butyrivibrio, Calymmatobacterium, Campylobacter, Capnocytophaga, Cardiobacterium, Catonella, Cedecea, Cellulomonas, Centipeda, Chlamydia, Chlamydophila, Chromobacterium, Chyseobacterium, Chryseomonas, Citrobacter, Clostridium, Collinsella, Comamonas, Corynebacterium, Coxiella, Cryptobacterium, Delftia, Dermabacter, Dermatophilus, Desulfomonas, Desulfovibrio, Dialister, Dichelobacter, Dolosicoccus, Dolosigranulum, Edwardsiella, Eggerthella, Ehrlichia, Eikenella, Empedobacter, Enterobacter, Enterococcus, Erwinia, Erysipelothrix, Escherichia, Eubacterium, Ewingella, Exiguobacterium, Facklamia, Filifactor, Flavimonas, Flavobacterium, Francisella, Fusobacterium, Gardnerella, Globicatella, Gemella, Gordona, Haemophilus, Hafnia, Helicobacter, Helococcus, Holdemania Ignavigranum, Johnsonella, Kingella, Klebsiella, Kocuria, Koserella, Kurthia, Kytococcus, Lactobacillus, Lactococcus, Lautropia, Leclercia, Legionella, Leminorella, Leptospira, Leptotrichia, Leuconostoc, Listeria, Listonella, Megasphaera, Methylobacterium, Microbacterium, Micrococcus, Mitsuokella, Mobiluncus, Moellerella, Moraxella, Morganella, Mycobacterium, Mycoplasma, Myroides, Neisseria, Nocardia, Nocardiopsis, Ochrobactrum, Oeskovia, Oligella, Orientia, Paenibacillus, Pantoea, Parachlamydia, Pasteurella, Pediococcus, Peptococcus, Peptostreptococcus, Photobacterium, Photorhabdus, Plesiomonas, Porphyrimonas, Prevotella, Propionibacterium, Proteus, Providencia, Pseudomonas, Pseudonocardia, Pseudoramibacter, Psychrobacter, Rahnella, Ralstonia, Rhodococcus, Rickettsia Rochalimaea Roseomonas, Rothia, Ruminococcus, Salmonella, Selenomonas, Serpulina, Serratia, Shewenella, Shigella, Simkania, Slackia, Sphingobacterium, Sphingomonas, Spirillum, Staphylococcus, Stenotrophomonas, Stomatococcus, Streptobacillus, Streptococcus, Streptomyces, Succinivibrio, Sutterella, Suttonella, Tatumella, Tissierella, Trabulsiella, Treponema, Tropheryma, Tsakamurella, Turicella, Ureaplasma, Vagococcus, Veillonella, Vibrio, Weeksella, Wolinella, Xanthomonas, Xenorhabdus, Yersinia,* and *Yokenella*.

Examples of the Gram-positive bacteria include *Mycobacterium tuberculosis, Mycobacterium bovis, Mycobacterium avium, Mycobacterium intracellular, Mycobacterium africanum, Mycobacterium kansasii, Mycobacterium marinum, Mycobacterium ulcerans, Staphylococcus aureus, Staphylococcus epidermidis, Staphylococcus equi, Streptococcus pyogenes, Streptococcus agalactiae, Listeria monocytogenes, Listeria ivanovii, Bacillus anthracia, Bacillus subtilis, Nocardia asteroides, Actinomyces israelii, Propionibacterium acnes,* and *Enterococcus* sp. Examples of the Gram-negative bacteria include *Clostridium tetani, Clostridium perfringens, Clostridium botulinum, Pseudomonas aeruginosa, Vibrio cholerae, Actinobacillus pleuropneumoniae, Pasteurella haemolytica, Pasteurella multocida, Legionella pneumophila, Salmonella typhi, Brucella abortus, Chlamydi trachomatis, Chlamydia psittaci, Coxiella burnetii, Escherichia coli, Neiserria meningitidis, Neiserria gonorrhea, Haemophilus influenzae, Haemophilus ducreyi, Yersinia pestis, Yersinia enterolitica, Escherichia coli, Enterococcus hirae, Burkholderia cepacia, Burkholderia pseudomallei, Francisella tularensis, Bacteroides fragilis, Fusobascterium nucleatum, Cowdria ruminantium,* but are not limited thereto.

In the coating agent of the present disclosure, urushiol may be contained in an amount of 1 to 20% by weight. If the content is less than 1% by weight, it may be difficult to express the properties of urushiol with a too small content. If the content is more than 20% by weight, the content of urushiol is too high and thus complete thermal curing may not occur, which may leave unreacted materials on the coating surface. In addition, the high viscosity may cause a problem in the preparation process, and the phenomenon of clogging of the pores of the substrate may occur.

Further, the content of the inorganic antimicrobial agent in the coating agent may be 0.1 to 1% by weight. If the content is less than the above range, the antimicrobial activity may be reduced. If the content exceeds the above range, there may be a problem in dispersibility due to aggregation between the antimicrobial agents.

In addition, in the substrate of the present disclosure, the content of urushiol on the substrate may be 15 to 170% by weight, and that of the inorganic antimicrobial agent may be 4 to 10% by weight. If the content is less than the above range, there may be a problem that the antimicrobial activity is reduced, and if the content exceeds the above range, the phenomenon of clogging of the pores of the substrate may occur.

In a specific example, the substrate may be a nonwoven fabric material. The nonwoven fabric is a fiber structure of a planar structure which is prepared by forming sheet-shaped webs that entangle various fibers such as natural fiber, chemical fiber, glass fiber, metal fiber or the like, according to their mutual properties, and bonding the webs by a mechanical or physical method. As a raw material fiber, one or more selected from the group consisting of natural fibers and synthetic fibers may be used. For example, it may be a nonwoven fabric material containing one or more selected from viscose rayon fiber, polypropylene fiber, polyethylene fiber, polyethylene terephthalate fiber, polyester fiber, nylon fiber and cellulose fiber. In the present disclosure, the material or preparation method of the nonwoven fabric is not particularly limited. The nonwoven fabric can be applied as long as it is those commonly used in the art. Preferably, the nonwoven fabric may be one or more types selected from chemical bonded nonwoven fabric, thermal bonded nonwoven fabric, Air Ray nonwoven fabric, wet-laid nonwoven fabric, needle punched nonwoven fabric, spunlace nonwoven fabric (water-jet entanglement), spun bonded nonwoven fabric, melt blown nonwoven fabric, stitch bonded nonwoven fabric and electrospun nonwoven fabric. The nonwoven fabric may have an average thickness of 0.1 to 5 mm or 0.2 to 1 mm, and may be appropriately changed depending on the type of apparatus to which the substrate is applied.

In one embodiment of the present disclosure, there is provided a method for antimicrobial coating on the surface of a substrate, including the step of: adding an organic antimicrobial agent to a coating agent including urushiol; impregnating the substrate with the coating agent to perform high temperature polymerization; and drying the substrate, wherein the inorganic antimicrobial agent is fixed onto the surface of the substrate while urushiol being crosslinked.

Urushiol may be diluted with an organic solvent. Examples of the organic solvent may include methanol, ethanol, propanol, butanol, benzene, toluene, ethylbenzene, diethylbenzene, xylene, $C_{1-4}$ alkyl acetate, methyl ethyl ketone, acetone, tetrahydrofuran, 1,4-dioxane, turpentine, but are not limited thereto. In a specific example, urushiol may be diluted with an alcoholic solvent or oil. The dilution concentration of urushiol is not particularly limited, but, for example, urushiol may be diluted by 0.1 to 50% by weight, 0.5 to 30% by weight, or 0.1 to 20% by weight with the organic solvent, and can be appropriately adjusted and used by those skilled in the art.

Examples of the method of impregnating the substrate in the urushiol coating solution may include, but are not limited to, an immersion method, a dipping method, a roller method, an air knife method, a spray method, and the like.

The substrate to which the coating agent is introduced can be subjected to high temperature treatment to induce thermal crosslinking and polymerization of urushiol. Since the urushiol is cured by the high temperature treatment and is tightly bound to the inorganic antimicrobial agent on the surface, the inorganic antimicrobial agent may be firmly fixed onto the surface of the substrate. The heating temperature for inducing the polymerization reaction of urushiol may be 70 to 200° C., or 100 to 150° C., and the heating time may be 1 to 100 hours, 1 to 72 hours, or 1 hour to 6 hours. Within this range, the reaction time may be shorter as the temperature increases and be longer as the temperature decreases. However, if the temperature exceeds 200° C., the polymerization reaction may proceed rapidly, and it may be difficult to adjust the reaction. The reaction time may be appropriately adjusted depending on the degree to which the coating agent is fixed on the surface of the substrate, but the reaction may be terminated when the fluidity of urushiol is significantly reduced.

The substrate of the present disclosure may be used as an antimicrobial filter, and the antimicrobial filter may be effectively used as an antimicrobial filter applied to vacuum cleaners, air purification apparatuses, automobiles, refrigerators, air handlers, gas masks, water purifiers, clean rooms, and the like.

In one example, the antimicrobial filter may be an air filter that can be used for air purification. The air filter may be a vacuum cleaner filter or an air purifier filter used in homes, but it may also be an air filter used in an air purification facility or a dust collection facility that may be used in a large capacity for vehicles or industries such as factories or research institutes. In addition, the filter may also be used for water treatment.

MODE FOR CARRYING OUT THE INVENTION

The present disclosure will be described in more detail by way of Examples. However, these Examples are given for illustrative purposes only, and the scope of the present disclosure is not limited by these examples.

Example 1. Preparation of Antimicrobial Coating Agent and Antimicrobial Substrate for Substrate Surface Treatment A zeolite inorganic-based antimicrobial agent containing silver ions was added to a natural coating agent based on an urushiol solution to prepare a coating agent for substrate surface treatment. To this end, urushiol (HanKook National Co., Ltd.) was diluted to 1/30 in ethanol to prepare a coating solution, to which zeolites containing silver ions (Zeomic product provided by IlKwang Polymer) were added and dispersed. The zeolites containing silver ions were added to the coating solution in a 0.3% w/v ratio. After the substrate of Miracloth nonwoven fabric (Sigma-Aldrich) was immersed in the prepared coating agent for 30 minutes, it was subjected to high temperature polymerization and drying at 140° C. to introduce the coating agent onto the surface of the substrate.

Example 2. Preparation of Antimicrobial Coating Agent and Antimicrobial Substrate for Substrate Surface Treatment A coating agent was prepared in the same manner as in Example 1, except that a 1/5 diluted urushiol solution was used, and then the coating agent was introduced onto the surface of the substrate.

Example 3. Preparation of Antimicrobial Coating Agent and Antimicrobial Substrate for Substrate Surface Treatment A coating agent was prepared in the same manner as in Example 1, except that a 1/100 diluted urushiol solution was used, and then the coating agent was introduced onto the surface of the substrate.

Comparative Example 1. Preparation of Urushiol Coating Agent and Antimicrobial Substrate Urushiol (HanKook National Co., Ltd.) was diluted by 1/30 with ethanol to prepare a urushiol coating agent. After the substrate of Miracloth nonwoven fabric (Sigma-Aldrich) was immersed in the prepared coating agent for 30 minutes, it was subjected to high temperature polymerization and drying at 140° C. to introduce the coating agent onto the surface of the substrate.

Comparative Example 2. Preparation of Coating Agent Containing Inorganic Antimicrobial Agent and Antimicrobial Substrate Zeolites containing silver ions (Zeomic product provided by IlKwang Polymer) were added and dispersed in ethanol. The zeolites containing silver ions were added thereto in a 0.3% w/v ratio. After the substrate of Miracloth nonwoven fabric (Sigma-Aldrich) was immersed in the prepared coating agent for 30 minutes, it was subjected to high temperature polymerization and drying at 140° C. to introduce the coating agent onto the surface of the substrate.

Comparative Example 3. Preparation of Antimicrobial Coating Agent and Antimicrobial Substrate for Substrate Surface Treatment Urushiol (HanKook National Co., Ltd.) was diluted by 1/30 with ethanol to prepare a coating solution, and zeolites containing silver ions (Zeomic product provided by IlKwang Polymer) were added and dispersed in the coating solution. The zeolites containing silver ions were added to the coating solution in a 0.3% w/v ratio. After the substrate of Miracloth nonwoven fabric (Sigma-Aldrich) was immersed in the prepared coating agent for 30 minutes, it was dried at 30° C. to introduce the coating agent onto the surface of the substrate.

TABLE 1

Summary of Examples and Comparative Examples

| | Inorganic-based Antimicrobial agent | Urushiol | Heat Treatment |
| --- | --- | --- | --- |
| Example 1 | ◯ | 1/30 diluted solution | ◯ |
| Example 2 | ◯ | 1/5 diluted solution | ◯ |
| Example 3 | ◯ | 1/100 diluted solution | ◯ |
| Comparative Example 1 | — | 1/30 diluted solution | ◯ |
| Comparative Example 2 | ◯ | — | ◯ |
| Comparative Example 3 | ◯ | 1/30 diluted solution | ✕ |

Experimental Example 1. Scanning Electron Microscope (SEM) Observation

Figure 1:
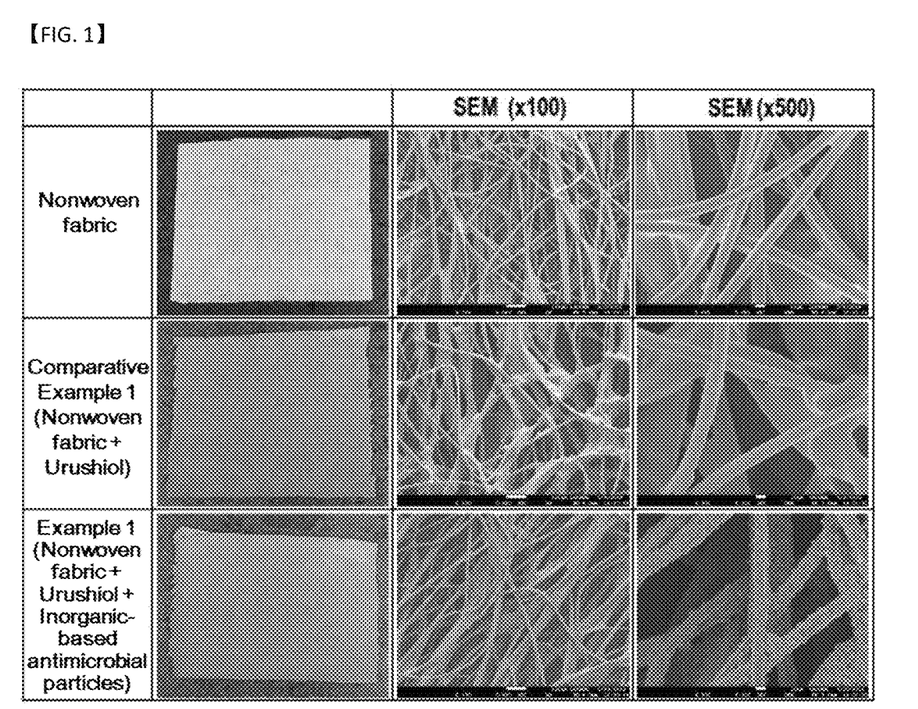
FIG. 1 shows scanning electron microscope (SEM) images of the surface of the substrates prepared according to one Example and Comparative Example of the present discourse.

As a result of observing the antimicrobial substrate of Example 1 under a scanning electron microscope (SEM), the coating agent was uniformly coated onto the surface of the nonwoven fabric fiber, and the inorganic antimicrobial agent was attached to the surface of the fiber (FIG. 1). In particular, it was confirmed that since urushiol was thermally crosslinked and cured, and was firmly bound to the inorganic antimicrobial agent on the surface, there was no difference in the surface of the substrate before and after washing (FIG. 2). In addition, in Example 1, the inorganic antimicrobial agent was coated by urushiol and thus bound onto the surface of the fiber, the surface was relatively smooth, and the fiber surface and the particles were coated together during the curing process of urushiol and thus stably fixed (FIG. 3).

In Comparative Example 1, only urushiol was used as the coating agent without inorganic antimicrobial agent. It was confirmed that as the coating agent was cured, the white nonwoven fabric was changed to brown, and it was confirmed through SEM image that the coating agent was uniformly coated onto the surface of the nonwoven fabric (FIG. 1).

In Comparative Example 2, only the inorganic antimicrobial agent (silver ion-containing zeolites) was used as the coating agent without urushiol, and it was observed that a large amount of the inorganic antimicrobial agent dropped out after washing of the coated substrate. In addition, in the absence of urushiol, it was observed that the inorganic antimicrobial agent was introduced onto the nonwoven fabric in the aggregated form (FIG. 2). Further, the inorganic antimicrobial agent (silver ion-containing zeolites) was in the form of a hexahedral shape, had a rough surface, and was fixed onto the surface of the fiber by simple physical adsorption (FIG. 3).

In Comparative Example 3, the coating agent containing both urushiol and the inorganic antimicrobial agent was used, but the urushiol was not cured at a high temperature. Thus, it was observed that the inorganic antimicrobial agent dropped out after washing of the coated substrate (FIG. 2).

Experimental Example 2. Infrared Spectroscopy Analysis (FT-IR)

It was confirmed through FT-IR analysis that urushiol was cured through a simple thermal crosslinking in the air. To this end, each sample was cut into 2×2 cm size and measured in reflection mode (ATR).

Figure 4:
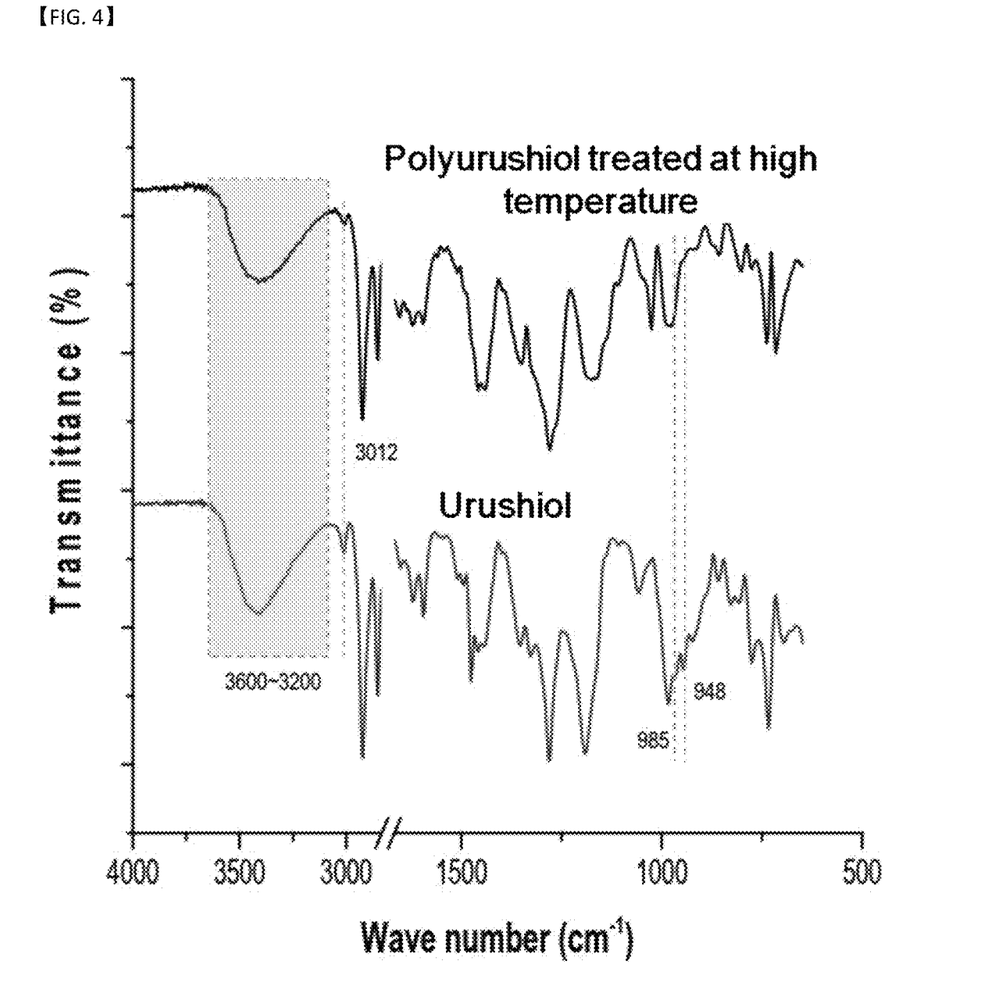
FIG. 4 shows the results of FT-IR analysis of polyurushiol thermally crosslinked with urushiol monomer.

FIG. 4 shows the results of FT-IR analysis of the polyurushiol crosslinked with the urushiol monomer. In FIG. 4, the 3012 $cm^{-1}$ region represents =C—H stretching vibration, which was reduced as urushiol was thermally crosslinked (—CH=CH—+—CH=CR1→—CH—CH—CH—CR1). The 3600-3200 $cm^{-1}$ region represents —OH vibration, which was indicated by a sharp peak in the case of the urushiol monomer, but the peak was broadened due to hydrogen bonds as urushiol was thermally crosslinked. It was confirmed that the 948 and 985 $cm^{-1}$ regions were reduced or disappeared as the conjugated double bond of the urushiol monomer was thermally crosslinked. Accordingly, it was confirmed that the urushiol monomer was crosslinked through a thermal crosslinking, and thus was ultimately found in the form of a cured polyurushiol.

Based on these, FT-IR analysis was carried out on the antimicrobial substrate coated according to Example 1, and the results were shown in FIG. 5. In FIG. 5, the FT-IR peaks of the inorganic antimicrobial agent (silver ion-containing zeolites) were —OH peak at 3600-3200 $cm^{-1}$, Si—OH peak at 900-850 $cm^{-1}$, and Si—O—Si peak at 1100-1000 $cm^{-1}$. The —OH vibration region at 3600-3200 $cm^{-1}$ overlapped with the peak of the urushiol monomer. The 1100-850 $cm^{-1}$ region represents the Si—OH and Si—O—Si peaks, which were possibly distinguished as the peak of the inorganic antibacterial agent. It could be seen that a large amount of inorganic antimicrobial agent existed on the surface, in view of the fact that the intensity of the peak at the 1100-850 $cm^{-1}$ region was very large compared to the other specific peaks.

Experimental Example 3. Confirmation of Antimicrobial Activity

Antimicrobial experiments were carried out on the substrates except for Comparative Example 2 in which the desorption of particles occurred during the washing process, and Comparative Example 3 in which no urushiol crosslinking was formed. The antimicrobial experiments were performed by appropriately modifying KS K 0693, the antimicrobial experiment standard. Specifically, 4 ml of bacteria at a concentration of $10^4$ CFU (1×PBS 4 ml, 40 µl of bacteria at OD 600 nm=1) was added to 0.4 g of microbial fabric specimen finely cut into a 50 ml conical tube. A control specimen was prepared by adding 0.4 g of untreated fabric instead of the antimicrobial fabric specimen. *Staphylococcus aureus* was used as Gram-positive bacteria, and *Escherichia coli* was used as Gram-negative bacteria. The strains were obtained from the Korea Culture Center of Microorganisms. The prepared specimens were subjected to suspension culture at (37±1)° C. for 24 hours using a shaking incubator. After the bacterial culture was completed, the specimens were diluted 5-fold by adding 16 ml of 1×PBS, and vortexed for 30 minutes to 1 hour depending on the type of the fabric. This step was carried out for the purpose of removing bacteria stuck in the fabric or attached to the surface as a liquid phase. To this end, the Miracloth should be vortexed for at least 30 minutes, and yarn for at least 1 hour. When the vortexing was completed, 100 µl of each specimen was inoculated into agar solid media and smeared using a spreader or glass beads until absorbed into the media. The solid media were subjected to stationary culture at (37±1)° C. for 24 hours. The colonies of each Petri dish were counted and recorded. Then, the reduction in bacteriostatic was determined by calculating the reduction percentage of the CFU count of the antimicrobial specimen relative to the control specimen.

Figure 6:
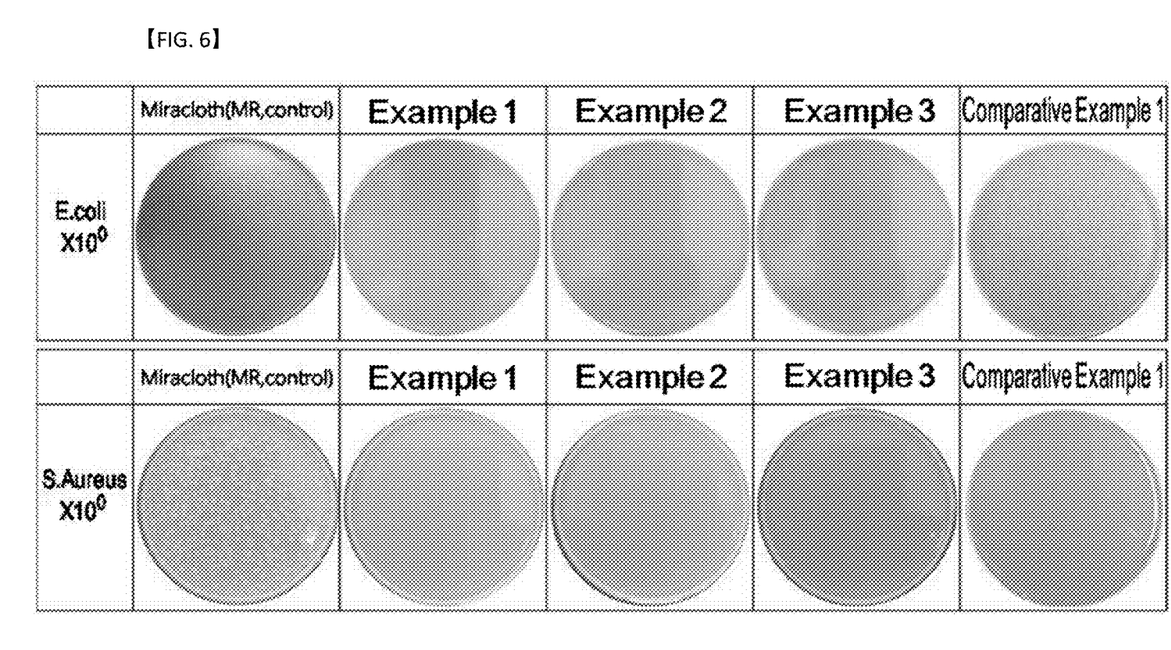
FIG. 6 shows the antimicrobial test results for confirming the antimicrobial activity on the surface of the substrates prepared according to Examples and Comparative Example of the present disclosure.

As a result, the fibers coated with urushiol and the inorganic antimicrobial agent according to Examples 1, 2, and 3 showed antimicrobial activity of 99.9% against both *Staphylococcus aureus* and *Escherichia coli*. However, in the case of the fiber coated with urushiol according to Comparative Example 1, antimicrobial activities against *Escherichia coli* were not exhibited, and antimicrobial activities of 99.9% were exhibited only against Gram-positive *Staphylococcus aureus* (FIG. 6).

While the present disclosure has been described with reference to the particular illustrative embodiments, it will be understood by those skilled in the art that the present disclosure may be embodied in other specific forms without departing from the technical spirit or essential characteristics of the present disclosure. Therefore, the embodiments described above are considered to be illustrative in all respects and not restrictive. Furthermore, the scope of the present disclosure is defined by the appended claims rather than the detailed description, and it should be understood that all modifications or variations derived from the meanings and scope of the present disclosure and equivalents thereof are included in the scope of the appended claims.

The invention claimed is:

1. A substrate having an antimicrobial coating on at least one surface the substrate,
wherein an antimicrobial coating agent comprising an urushiol and an inorganic antimicrobial agent is coated onto the surface providing the antimicrobial coating,
wherein the inorganic antimicrobial agent is fixed onto the surface of the substrate and the urushiol is crosslinked, and
wherein the substrate is fibers.

2. The substrate of claim 1, wherein the inorganic antimicrobial agent comprises calcium phosphate, calcium zinc phosphate, calcium carbonate, zinc pyrithione, or an inorganic carrier and metal ions.

3. The substrate of claim 1, wherein the antimicrobial coating agent comprises the urushiol in an amount of 1 to 20% by weight, and the inorganic antimicrobial agent in an amount of 0.1 to 1% by weight based on the total weight of the antimicrobial coating agent.

4. The substrate of claim 1, wherein the antimicrobial coating has an antimicrobial activity against Gram-positive bacteria and Gram-negative bacteria.

5. The substrate of claim 1, wherein the antimicrobial coating agent is uniformly coated onto the surface.

6. A method for applying an antimicrobial coating on a surface of a substrate, comprising the steps of:
impregnating the substrate with an antimicrobial coating agent comprising an inorganic antimicrobial agent and a urushiol; performing high temperature polymerization; and
drying the coated substrate,
wherein the inorganic antimicrobial agent is fixed onto the surface of the substrate and urushiol is crosslinked, and
wherein the substrate is fibers.

7. The method of claim 6, wherein the urushiol is diluted in an alcoholic solvent or oil.

8. The method of claim 6, wherein the inorganic antimicrobial agent comprises calcium phosphate, calcium zinc phosphate, calcium carbonate, zinc pyrithione, or an inorganic carrier and metal ions.

9. The method of claim 6, wherein the antimicrobial coating agent comprises the urushiol in an amount of 1 to 20% by weight, and the inorganic antimicrobial agent in an amount of 0.1 to 1% by weight based on the total weight of the antimicrobial coating agent.

10. The method of claim 6, wherein the antimicrobial coating agent has antimicrobial activity against Gram-positive bacteria and Gram-negative bacteria.

11. The substrate of claim 2, wherein the antimicrobial coating agent comprises the urushiol in an amount of 1 to 20% by weight, and the inorganic antimicrobial agent in an amount of 0.1 to 1% by weight based on the total weight of the antimicrobial coating agent.

12. The method of claim 7, wherein the inorganic antimicrobial agent comprises calcium phosphate, calcium zinc phosphate, calcium carbonate, zinc pyrithione, or an inorganic carrier and metal ions.

13. The method of claim 6, further comprising the step of adding an inorganic antimicrobial agent to a coating agent including urushiol to provide the antimicrobial coating agent of the impregnating step.

14. The substrate of claim 2, wherein the inorganic carrier comprises zeolite or silica alumina, and the metal ions comprise silver, copper, manganese, or zinc.

15. The method of claim 8, wherein the inorganic carrier comprises zeolite or silica alumina, and the metal ions comprise silver, copper, manganese, or zinc.

16. The method of claim 12, wherein the inorganic carrier comprises zeolite or silica alumina, and the metal ions comprise silver, copper, manganese, or zinc.

17. The substrate of claim 14,
wherein the zeolite is at least one selected from the group consisting of A-type zeolite, X-type zeolite, Y-type zeolite, high-silica zeolite, sodalite, mordenite, analcime, clinoptilolite, chabazite, and erionite.

18. The method of claim 15,
wherein the zeolite is at least one selected from the group consisting of A-type zeolite, X-type zeolite, Y-type zeolite, high-silica zeolite, sodalite, mordenite, analcime, clinoptilolite, chabazite, and erionite.

19. The method of claim 16,
wherein the zeolite is at least one selected from the group consisting of A-type zeolite, X-type zeolite, Y-type zeolite, high-silica zeolite, sodalite, mordenite, analcime, clinoptilolite, chabazite, and erionite.

\* \* \* \* \*